United States Patent [19]
Rogers

[11] Patent Number: 5,351,284
[45] Date of Patent: Sep. 27, 1994

[54] ANTENNA FOR A BASE UNIT OF A CORDLESS TELEPHONE SYSTEM

[75] Inventor: Max W. Rogers, Franklin Park, Ill.

[73] Assignee: Dynascan Corporation, Chicago, Ill.

[21] Appl. No.: 823,177

[22] Filed: Jan. 21, 1992

[51] Int. Cl.⁵ .................. H04M 11/00; H04H 1/02; H04B 1/38
[52] U.S. Cl. ........................ 379/61; 455/6.1; 455/89; 455/90
[58] Field of Search ............ 379/58, 61, 66; 343/789, 841, 856; 455/6.1, 269, 270, 89, 90, 128, 129, 270

[56] References Cited

U.S. PATENT DOCUMENTS

| | | | |
|---|---|---|---|
| 2,218,830 | 10/1940 | Rose et al. | 343/720 |
| 3,803,366 | 4/1974 | Ishii et al. | 379/61 |
| 3,863,157 | 1/1975 | Quinlan et al. | 455/270 |
| 4,032,723 | 6/1977 | Mendoza | 179/61 |
| 4,479,033 | 10/1984 | Brown et al. | 379/66 |
| 4,507,646 | 3/1985 | Hamlin et al. | 455/270 |
| 4,612,668 | 9/1986 | Sarac | 455/129 |
| 4,661,992 | 4/1987 | Garay et al. | 455/129 |
| 4,685,099 | 8/1987 | White et al. | 370/30 |
| 4,897,863 | 1/1990 | Newland | 379/58 |
| 4,979,205 | 12/1990 | Haraguchi et al. | 379/61 |
| 5,068,890 | 11/1991 | Nilssen | 379/58 |
| 5,151,643 | 9/1992 | Emmert et al. | 379/61 |

FOREIGN PATENT DOCUMENTS 1930531 12/1970 Fed. Rep. of Germany ........ 379/61

*Primary Examiner*—Stephen Chin
*Assistant Examiner*—Vijay Shankar
*Attorney, Agent, or Firm*—Wallenstein, Wagner & Hattis, Ltd.

[57] ABSTRACT

A base unit antenna for a cordless telephone system where the cordless telephone system comprises a base unit coupled via wires contained in a telephone cord to a telephone distribution system and a handset coupled to the base unit by a duplex radio communication link. The base unit includes a base unit antenna for transmitting and receiving the duplex radio communication with the handset. The antenna is preferably integrally contained in the telephone cord, but spaced from the telephone wires therein distribution system.

14 Claims, 2 Drawing Sheets

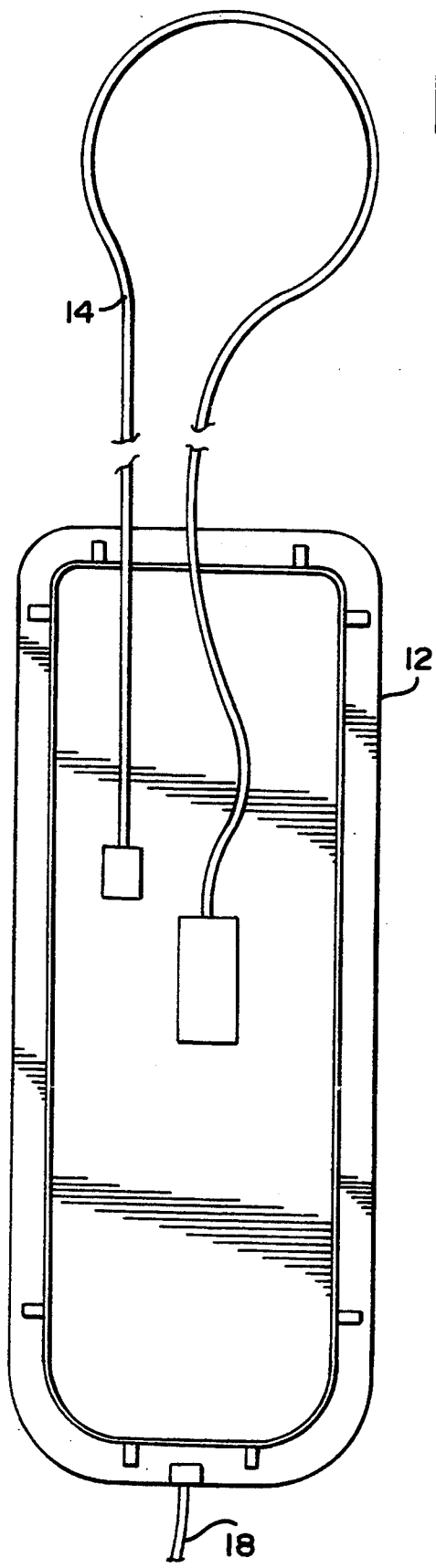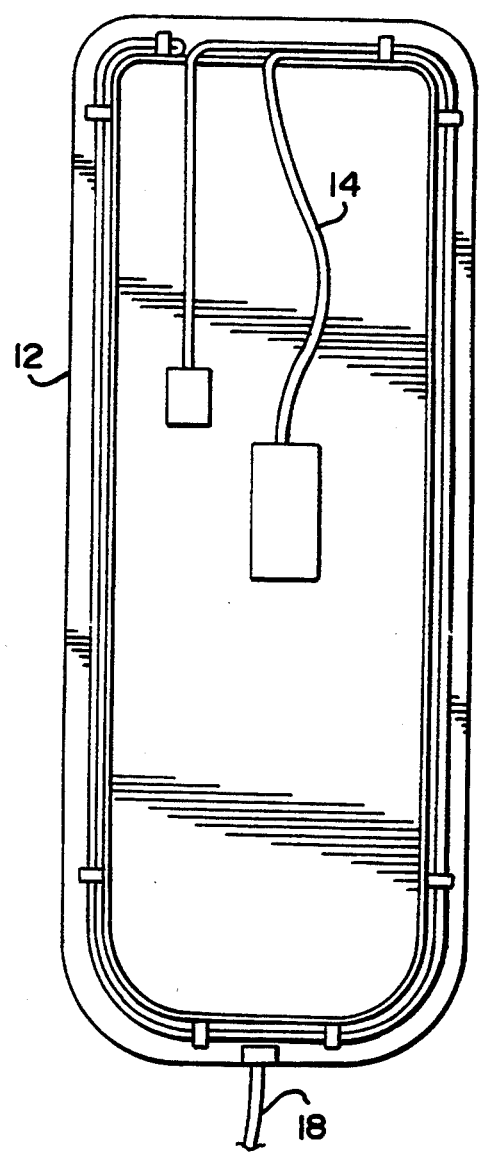

ANTENNA FOR A BASE UNIT OF A CORDLESS TELEPHONE SYSTEM

DESCRIPTION

1. Technical Field

The invention relates to a unique base unit antenna for a cordless telephone system where the base unit is coupled via a telephone line cord to a telephone distribution system and, in most cases, a power cord to an electrical outlet.

2. Background Prior Art

Cordless telephone systems are well known in the art. One such system is shown in Rogers, et. al., U.S. Pat. No. 4,876,709, and assigned to Dynascan Corporation, the assignee of this application.

Typically, a cordless telephone system comprises a base unit coupled via a telephone cord to a telephone distribution system, such as by plugging the telephone cord into a standard telephone wall connector. The base unit is also coupled to 115 volt AC power via a transformer-AC/DC converter and a power cord. The system further includes a handset coupled to the base unit by a duplex radio communication link.

In early cordless telephone systems, both the handset and the base unit had respective whip type antennas for transmitting and receiving the duplex radio communication. In the above-identified patent, the fragile, expandable whip antenna was replaced by a plate-shaped antenna contained within the handset. This design has worked well.

Also in the above-identified patent, the whip antenna for the base unit was replaced by a plate-shaped antenna contained within the base unit. However, this plate-shaped base unit antenna was never used commercially. The commercial base unit antenna until the present invention remained an expandable whip antenna. However, the base unit whip antenna posed a problem when placing the base unit on a counter, under a cabinet, because the cabinet could prevent full, upward extension of the whip antenna.

Additionally, FCC regulations, inter alia, limit the field strength of signal transmitted from the base unit to 10,000 microvolts/meter, at three meters. The orientation of the base unit antenna, whether it be a whip antenna or this plate-shaped antenna, relative to the telephone cord and the power cord significantly affects the transmitted field strength pattern because of electrical interactions between these elements which affect the overall field strength response pattern. This pattern was found to vary substantially as the relative positions of these elements are varied.

Because the FCC can conduct its tests at whatever orientation of the base unit antenna relative to the telephone cord and the power cord it desires, to avoid FCC disapproval, the cordless telephone system must be designed so that the field strength of the signal transmitted from the base unit does not exceed FCC limitations for the worse case orientation of the base unit antenna relative to the telephone and power cords which produces a maximum response at the 3 meter test distance. Since the manufacturer has no way of knowing the orientation of these elements selected by the FCC, the manufacturer must limit the transmitted power levels to meet this worse case situation. It therefore, is desirable to design a transmitter antenna system with a minimum variation between maximum and minimum response levels obtained with all the different possible relative orientations of the power cord, telephone line cord and antenna. For example, it has been found in one cordless telephone system tested at a 3 meter site, that with a whip antenna used as the base unit antenna, the field strength of the signal transmitted from the base unit varied as much as 35 dB, while according to the present invention, the field strength only varied by 10 dB.

The 35 dB variation on the whip antenna base unit was due to the fact that while the whip antenna was the intentional radiator, the telephone line was an unintentional radiator or reflector. It was therefore possible to orient the whip antenna and the telephone line such that there was almost perfect cancellation of the transmitted signal.

U.S. Pat. No. 4,879,863, discloses a cord-less telephone system which has two base unit antennas. One is a conventional transmitting whip antenna. The other is a receiving antenna comprising the telephone wire contained in the telephone cord. The telephone wire is connected via a wall jack with the house wiring. The receiving antenna utilizes the telephone wire in the telephone cord and the house telephone wiring. Because the transmitting antenna is separate from the telephone cord and the power cord, the field strength of the transmitted signal is expected to be affected by the relative orientation of the base unit housing, power cord and telephone line cord.

U.S. Pat. No. 2,218,830, discloses a broadcast band radio receiver which incorporates a receiving antenna in a power cord. The antenna is a conductor separate from the actual power conductors. However, this patent does not contemplate a transmitting antenna. Further, this patent does not contemplate locating a transmitting and receiving antenna in a telephone cord.

It is a preferred object to provide an antenna for a base unit of a cordless telephone system which not only is not a whip antenna to avoid the fragile and unattractive disadvantages thereof, but also fixes the relative position between the telephone cord and the base antenna so their orientation to each other cannot change. The antenna system can then be designed for maximum signal power limitation at 3 meters provided by FCC regulations for all possible orientations of the antenna/telephone cord and the power cords.

The present invention solves these and other problems.

SUMMARY OF THE INVENTION

The cordless telephone system of the invention is one which comprises a base unit which is coupled via wires contained in a telephone cord to a telephone distribution system and by a power cord to a power line. Also, it is preferred that the base unit housing is designed for various possible mounting locations including a wall mounted location where it is anchored over a telephone line connector outlet where the long telephone cord can be wrapped a number of times around the outside of the base unit housing, to present a neat appearance. The cordless telephone system also further includes a handset coupled to the base unit by a duplex radio communication link.

The basic novelty of the present invention is obtaining a substantial reduction in the variation of the maximum and minimum radiation intensity pattern for the various different possible relative orientations of the power and telephone cords and the transmitting antenna of the base unit of cordless telephone system. This is accomplished by integrating the transmitting antenna into either the telephone or power cord. In either case, the antenna is a wire in or on the cord which is separate and distinct from the wires in the telephone or power cord which connect to the commercial telephone or power lines involved. In the preferred embodiment, wherein the receiving antenna is contained in the telephone cord, it was found that the telephone wires and the house telephone wiring do not contribute to the efficiency of the receiving antenna.

It is a specific preferred form of the invention to incorporate this antenna into the telephone cord. It was unexpectedly found that the transmitting and receiving efficiency of the antenna when incorporated into the telephone cord was not seriously affected when it is wrapped around the base unit housing mounted on a vertical wall over the telephone line connector. Even in this application of the invention, the telephone wiring did not contribute to the efficiency of the receiving antenna.

Other aspects of the invention relate to the manner in which the antenna is integrated into the telephone cord.

One advantage in incorporating it into a telephone cord is that it could be formed by one of the wires in a conventional four wire telephone cord where the telephone needed only two of the wires in a manner to be described.

In one embodiment of the preferred form of the invention where the antenna is associated with the telephone cord, the telephone cord is a standard 4-wire type cord, the base unit is coupled to the telephone distribution system by two of the four wires, and the antenna comprises one of the other two of the four wires.

In another embodiment of the invention, the telephone cord is a custom 3-wire cord, the base unit is coupled to the telephone distribution system by two of the three wires, and the antenna comprises the third wire. In both embodiments, the antenna wire is formed by only a part of the length of the selected wire. A gap is formed in the wire, and the gap is covered by a patch to hide the gap. The gap further decouples the antenna from the telephone line. The remaining end of the selected wire remains disconnected from the telephone line connector.

A further novelty is that there is no height restrictions for this base antenna as there would be with a telescoping whip antenna underneath a cabinet or on a wall mount, where there may not be room enough to fully extend the antenna. If a whip antenna is not fully extended, the base transmit field strength could be reduced.

Other features and advantages of the invention will be apparent from the following specification taken in conjunction with the following drawings.

BRIEF DESCRIPTION OF DRAWINGS

FIGS. 4 and 5 are rear views of the cordless telephone system incorporating the unique transmitting antenna of the present invention where the base unit is mounted on a wall over a female telephone line connector and the telephone line cord is neatly wound around the periphery of the base unit housing.

DETAILED DESCRIPTION

Figure 1:
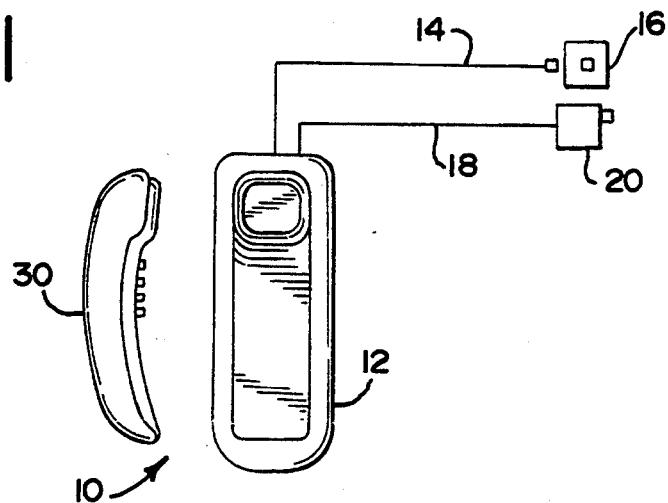
FIG 1 is a perspective view of a cordless telephone system according to the present invention.

While this invention is susceptible of embodiments in many different forms, there is shown in the drawings and will herein be described in detail, preferred embodiments of the invention with the understanding that the present disclosure is to be considered as an exemplification of the principles of the invention and is not intended to limit the broad aspects of the invention to the embodiments illustrated.

This application expressly incorporates by reference the specification of Rogers, et. al., U.S. Pat. No. 4,876,709.

A cordless telephone system, generally designated 10, is illustrated in FIG. 1. The cordless telephone system 10 comprises a base unit 12 coupled via telephone wires $T_1$, $T_2$, contained within a telephone cord 14 to a telephone distribution system, such as by plugging into a female telephone wall jack 16 in a house. A power cord 18 and a transformer-AC/DC converter 20, plugged into a standard wall power outlet provide DC power for the base unit 12, as is well known in the art.

The cordless telephone system 10 further includes a handset 30 coupled to the base unit 12 by duplex radio communication.

Figure 2:
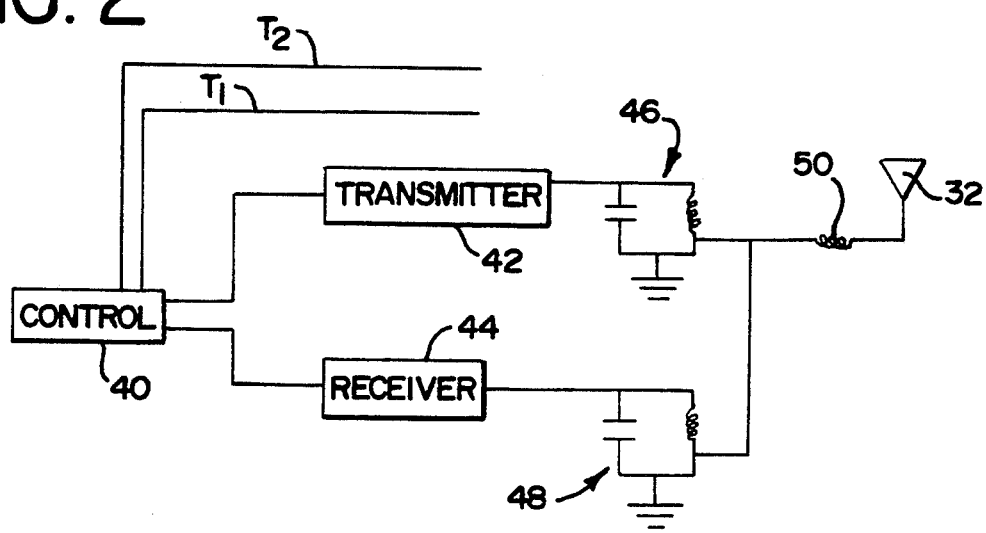
FIG. 2 is a block diagram of a receiver/transmitter circuit contained within the base unit of FIG. 1.
Figure 3:
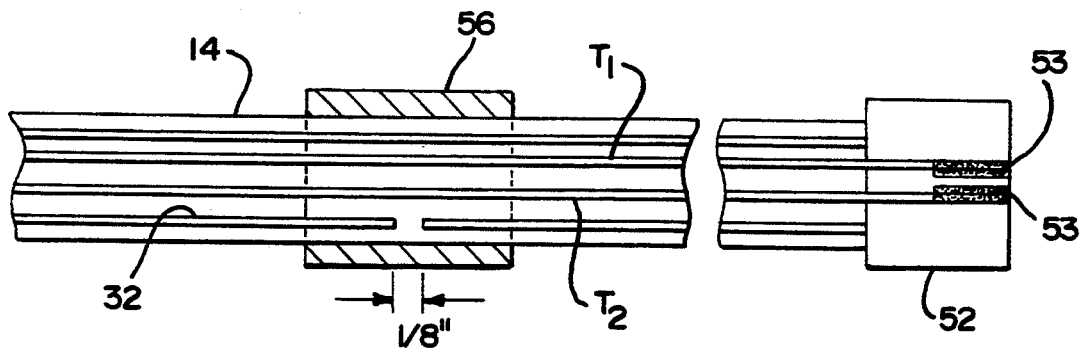
FIG. 3 is an enlarged view of a section of the telephone cord containing an antenna for the base unit, shown in FIG. 1.

Referring to FIGS. 2 and 3, a base unit antenna 32 is provided which is integrally contained in the telephone cord 14, but isolated from the telephone wires $T_1$, $T_2$. The base unit antenna 32 is preferably used for both transmitting and receiving the duplex radio communication to and from the handset 30.

Circuitry for transmitting and receiving the duplex communication in both the base unit 12 and handset 30 is well known in the art and is more fully described in the above incorporated patent. However, for purposes of this application, the base unit circuitry generally comprises control circuitry 40, transmitter circuitry 42 and receiver circuitry 44. The base unit antenna 32 is coupled to the transmitter circuitry 42 and the receiver circuitry 44 by respective first and second LC impedance matching circuits 46,48, and a load inductor 50. As is well known, the first and second LC impedance matching circuits 46,48 match the resistive component of the impedance of the base unit antenna 32 to the impedance of the respective transmitter circuitry 42 and receiver circuitry 44, which in the present case is 50 ohms. The load inductor 50 cancels the imaginary part of the impedance of the base unit antenna 32.

As illustrated in FIG. 3, the base unit antenna 32 is contained in the telephone cord 14. Typically, telephone systems use only two wires, usually the red wire and the green wire, herein referred to as $T_1$ and $T_2$. In one embodiment, the telephone cord 14 is a standard 4-wire type cord. The cord terminates at a male RJ-11 jack 52. Because only the center two wires of the cord are utilized by the telephone system, the jack 52 provides connectors 53 for these wires, but typically does not provide connectors for the outer two wires. Accordingly, the base unit is coupled to the telephone distribution system by the center two (i.e., red and green) of the four wires, and the base unit antenna 32 comprises preferably only a part of one of the other two of the four wires. It has been found that the base unit antenna 32 is preferably 35" long to match the 50 ohm input impedance of the transmitter circuitry 42 and the receiver circuitry 44. As 4.5" of the base unit antenna 32 is actually wiring within the base unit 12, the wire in the telephone cord 14 should be 30.5". Thus in accordance with this embodiment, the wire forming the base unit antenna 32 is cut 30.5" from the base unit 12. Specifically, a section at least ⅛" long is taken from the wire to eliminate capacitive coupling across the cut. The telephone cord 14 is then covered with a patch 56 to protect the cut, and hence the exposed wire, and to make the cord 14 more aesthetically pleasing.

Alternatively, the telephone cord 14 can be a 3-wire, custom formed cord, wherein the base unit 12 is coupled to the telephone distribution system by two of the three wires, and base unit antenna 32 comprises the third wire. As with the first embodiment, the antenna wire would be limited to 30.5" for proper impedance matching.

It might appear to those of ordinary skill in the art that it would be undesirable to incorporate the base unit antenna 32 in the telephone wire of a base unit which could be mounted on the side of a wall above the telephone jack, as illustrated in FIGS. 4 and 5. When the base unit is mounted in this way, it is important that the telephone cord be wrapped around the periphery of the base unit to form a neat mounting for the base unit and its telephone cord. It would seem to persons having ordinary skill in the art of design of such equipment that the transmitting antenna would not be effective when wound around the periphery of the base unit housing rather than being stretched out in a linear path. However, it has been found that the efficiency of the antenna integrated into the telephone cord is not seriously diminished by winding the telephone cord many times around the periphery of the base unit housing, as shown in FIG. 5.

While the invention has been described with reference to a preferred embodiment, it will be understood by those skilled in the art that various changes may be made and equivalents may be substituted for elements thereof without departing from the broader aspects of the invention. Also, it is intended that broad claims not specifying details of a particular embodiment disclosed herein as the best mode contemplated for carrying out the invention should not be limited to such details. Furthermore, while, generally, specific claimed details of the invention constitute important specific aspects of the invention in appropriate instances even the specific claims involved should be construed in light of the doctrine of equivalents.

I claim:

1. In a telephone system comprising a base unit and a portable handset coupled to the base unit by a duplex radio communication link and which is devoid of any antenna which extends or can be extended to project substantially from the handset, said base unit having a power cord having power conductors insertable into a commercial power line receptacle and a telephone cord including telephone wires to be connected to a telephone distribution system, and an antenna for the base unit for transmitting and receiving the duplex radio communication, the antenna being a wire integrally part of one of said power cord or telephone cord, but separate and distinct from said power conductor and said telephone wires by being spaced therefrom.

2. In a telephone system comprising a base unit and a portable handset coupled to the base unit by a duplex radio communication link and which is devoid of any antenna which extends or can be extended to project substantially from the handset, said base unit being coupled via telephone wires contained in a telephone cord to a telephone distribution system, an antenna for the base unit for transmitting and receiving the duplex radio communication, the antenna being an integral part of the telephone cord, but separate and distinct from said telephone wires by being spaced therefrom.

3. The cordless telephone system of claim 2 wherein:
the telephone cord is a 4-wire type cord;
the base unit is coupled to the telephone distribution system by two of the four wires; and
the antenna comprises one of the other two of the four wires.

4. The antenna of claim 2 wherein:
the telephone cord is a 3-wire cord;
the base unit is coupled to the telephone distribution system by two of the three wires; and
the antenna comprises the third wire.

5. The cordless telephone system of claim 2 wherein the antenna terminates short of the outer end of the telephone cord.

6. The cordless telephone system of claim 3 or 4 wherein the wires in said telephone cord run the full lengths of the telephone cord, and the wire therein forming said antenna is cut to form a gap therein.

7. The cordless telephone system of claim 6 wherein the gap in said wire is formed by cutting away the telephone cord at the location where the points of said wire to be cut are exposed, and wherein the cut away portion of said telephone cord is covered by a patch which hides the gap from view.

8. The cordless telephone system of claim 2, 3, or 4 wherein said antenna terminates prior to the end of said telephone cord.

9. The antenna of claim 7 wherein the antenna terminates prior to the end of the telephone cord.

10. The antenna of claim 1 or 2 wherein the handset includes a handset antenna for transmitting and receiving the duplex radio communication with the base unit, the handset antenna being integrally contained within the handset.

11. In a telephone system comprising:
a based unit and a portable handset coupled to the base unit by a duplex radio communication link and which is devoid of any antenna which extends or can be extended to project substantially from the handset, said base unit being coupled via wires contained in a telephone cord to a telephone distribution system;
a handset coupled to the base unit by a duplex radio communication link; and
a base unit antenna for receiving the duplex radio communication with the handset, the base unit antenna being integrally contained in the telephone cord by being a wire separate and distinct from the telephone wires by being spaced therefrom.

12. The cordless telephone system of anyone of claims 1, 2 or 11 wherein the base unit has a housing adapted to be mounted on a vertical wall adjacent to a telephone line connector, said telephone cord being of a length to reach a remotely located telephone line connector when the housing is mounted elsewhere on a table or the like, said telephone cord being coiled many times and secured to the base unit housing, the end of said telephone cord being electrically connected to said telephone line connector.

13. The cordless telephone system of claim 12 mounted on said vertical wall and said telephone cord is wrapped many times around the periphery of said housing.

14. The cordless telephone system of claim 2 or 11 wherein said base unit has a power cord insertable into a commercial power line receptacle.

* * * * *